United States Patent
Matteucci et al.

(10) Patent No.: US 10,309,544 B2
(45) Date of Patent: Jun. 4, 2019

(54) VALVE ASSEMBLY

(71) Applicant: Cameron International Corporation, Houston, TX (US)

(72) Inventors: Brian Matteucci, Houston, TX (US); Kody Carrillo, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/430,674

(22) Filed: Feb. 13, 2017

(65) Prior Publication Data
US 2018/0231135 A1    Aug. 16, 2018

(51) Int. Cl.
*F16K 11/07* (2006.01)
*E21B 33/035* (2006.01)

(52) U.S. Cl.
CPC ....... *F16K 11/0716* (2013.01); *E21B 33/0355* (2013.01); *Y10T 137/8667* (2015.04)

(58) Field of Classification Search
CPC ........... F16K 11/0716; Y10T 137/8667; Y10T 137/8663; Y10T 137/86686; Y10T 137/402; Y10T 137/86702; E21B 33/0355
See application file for complete search history.

(56) References Cited

U.S. PATENT DOCUMENTS

| 4,887,643 | A * | 12/1989 | Tomlin ................ E21B 33/0355 137/236.1 |
| 7,766,041 | B2 * | 8/2010 | Tackes ..................... F16K 3/262 137/625.3 |
| 7,779,853 | B2 * | 8/2010 | Reilly ................. F15B 13/0402 137/14 |
| 8,905,141 | B2 | 12/2014 | Gustafson |
| 9,394,758 | B2 | 7/2016 | Landrith, II et al. |
| 9,422,783 | B2 | 8/2016 | Gustafson et al. |
| 2013/0319557 | A1 | 12/2013 | Smith, III et al. |
| 2016/0084396 | A1 * | 3/2016 | Smith, III ................. F16K 1/42 251/368 |

FOREIGN PATENT DOCUMENTS

WO    2013192494 A1    12/2013

* cited by examiner

*Primary Examiner* — Craig M Schneider
*Assistant Examiner* — Kevin R Barss
(74) *Attorney, Agent, or Firm* — Helene Raybaud

(57) ABSTRACT

A valve includes a cage having at least one fluid inlet proximate a first end of the cage and a fluid outlet proximate a second end of the cage. The valve also includes a spool configured to move axially within the cage between an open position in which the spool enables fluid flow from the at least one fluid inlet to the fluid outlet and a closed position in which the spool blocks fluid flow from the at least one fluid inlet to the fluid outlet. The valve further includes an annular seal supported within an annular groove formed in one of the cage or the spool. The annular seal is configured to seal a radial gap between the cage and the spool while the spool is in the closed position and is positioned between the first end of the cage and the at least one fluid inlet along an axial axis of the valve to block fluid flow from the at least one fluid inlet to the fluid outlet while the spool is in the closed position.

19 Claims, 9 Drawing Sheets

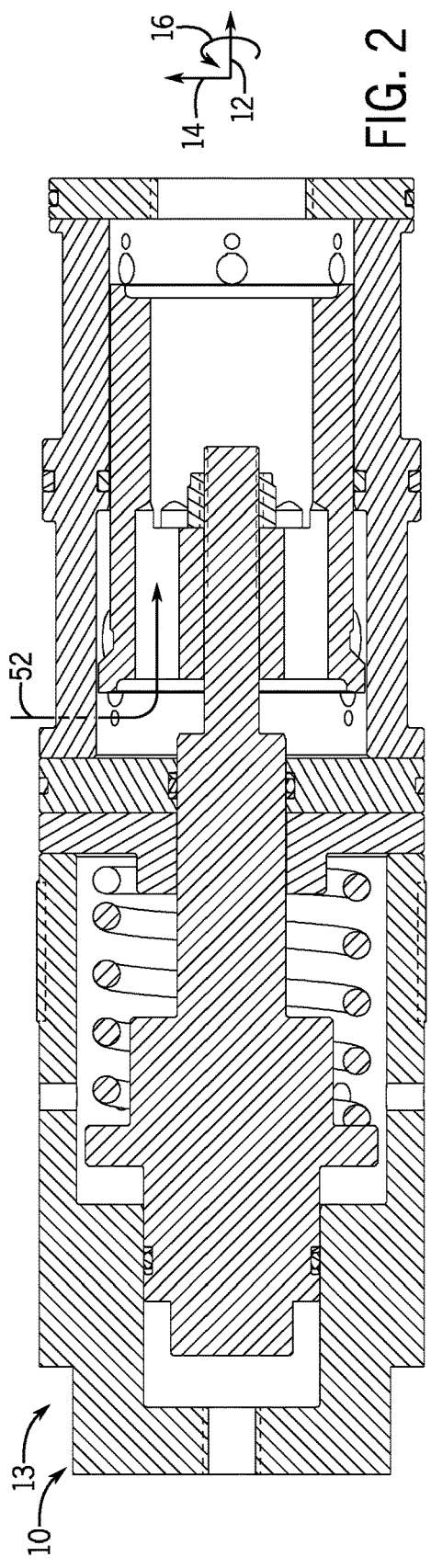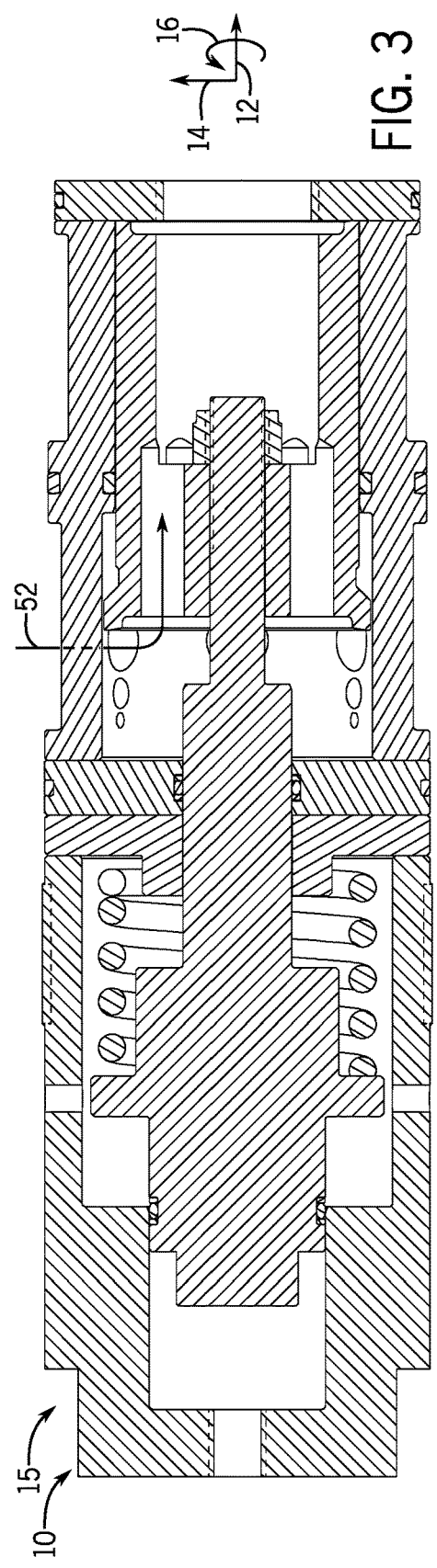

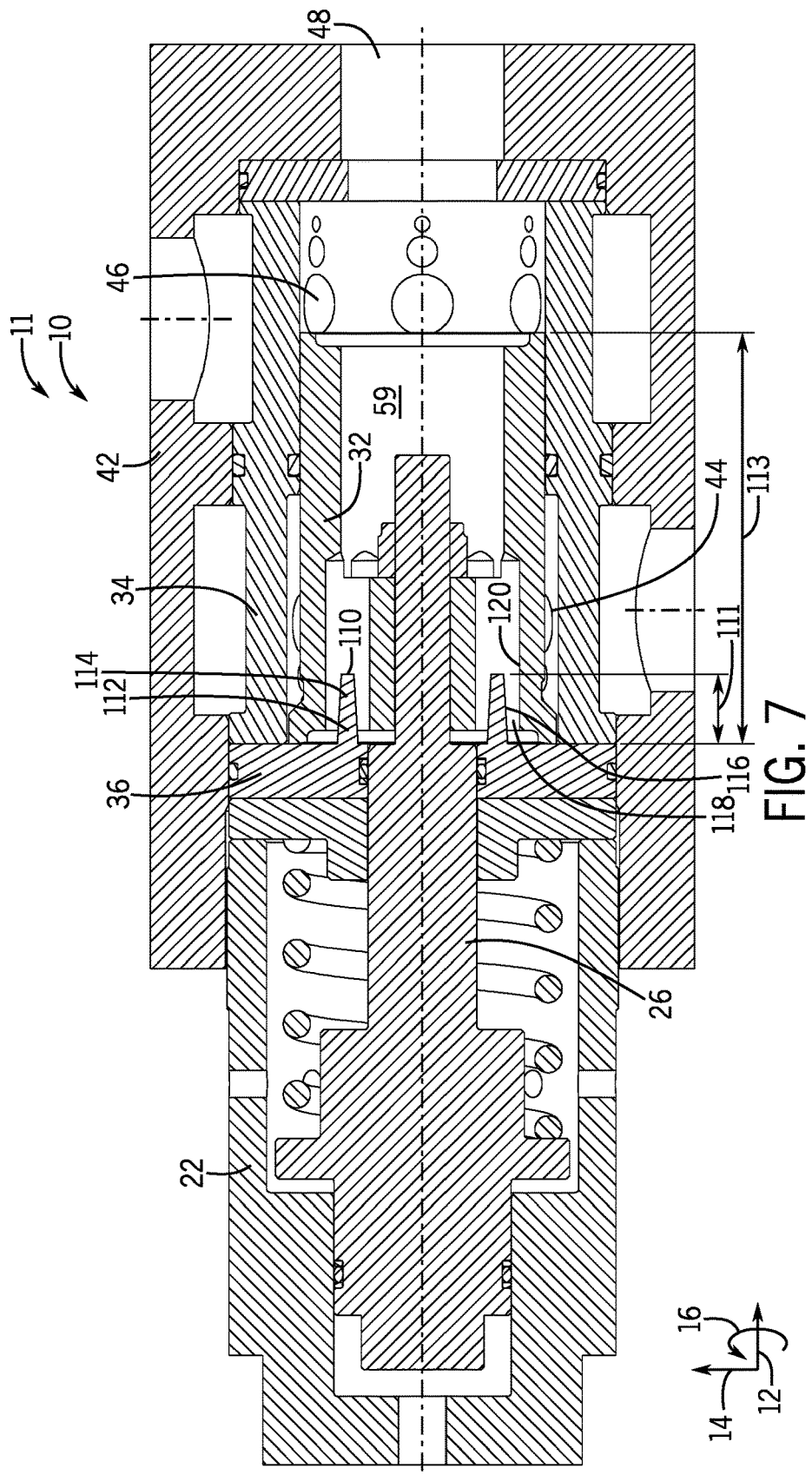

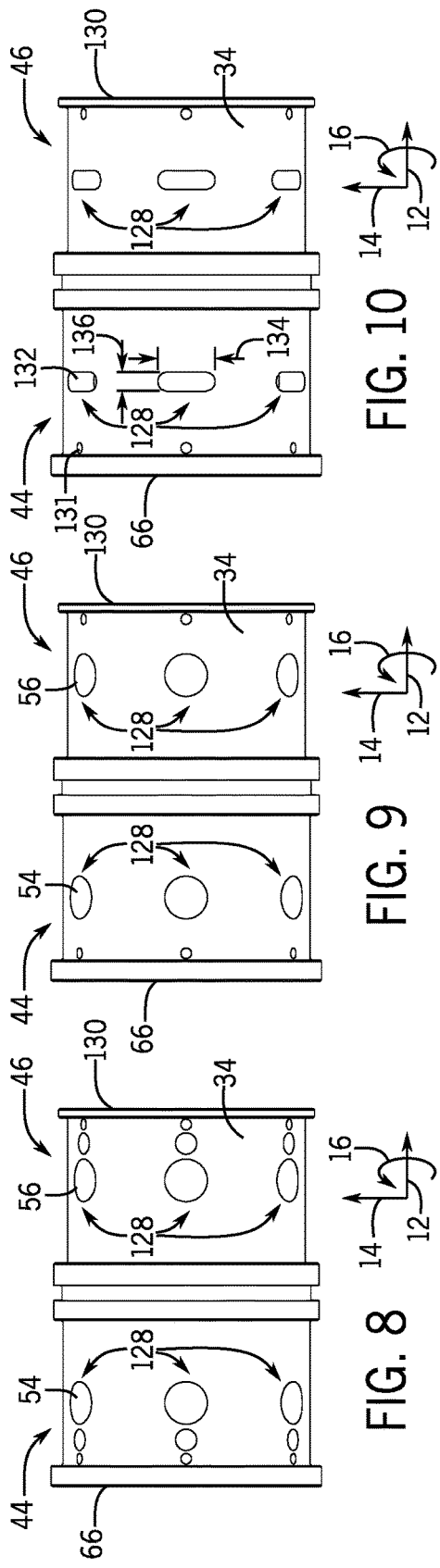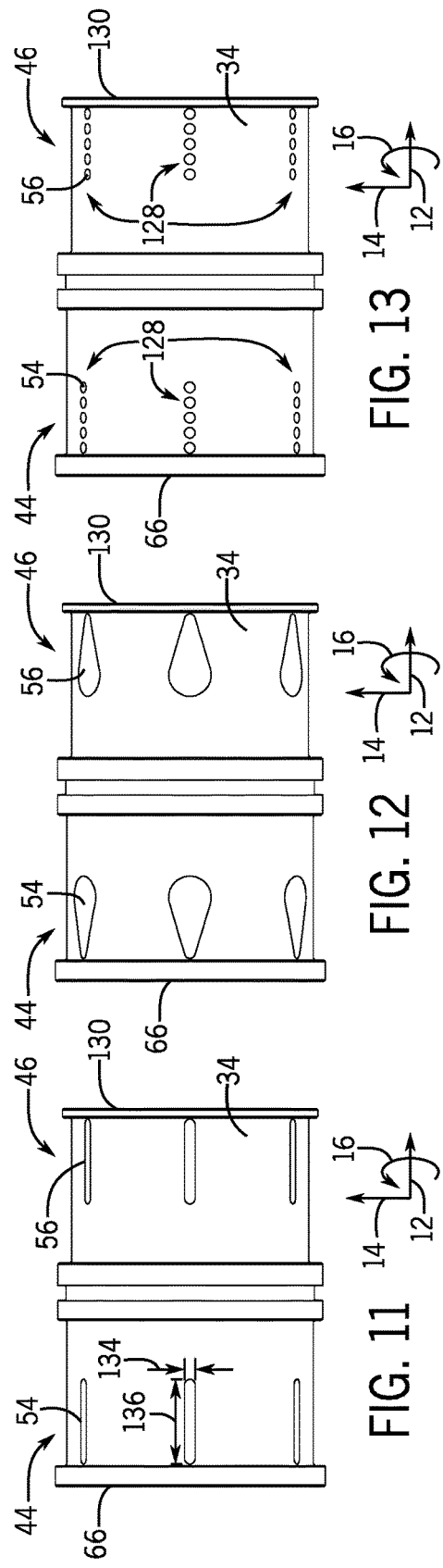

VALVE ASSEMBLY

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, a variety of flow control devices are used to control a fluid flow. Such fluid-handling systems may be employed in any variety of applications and industries, such as oil and gas systems, storage facilities, manufacturing facilities, refineries, water treatment facilities, industrial plants, and the like. For example, in the production of oil and natural gas, sub-plate mounted (SPM) valves may be employed to direct and regulate fluid flow in a lower marine riser package or a blowout preventer (BOP) stack. Unfortunately, some valves may experience high pressure spikes, which may cause damage or wear to components of the valve, tubing, or other surrounding structures.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 2 is a cross-sectional side view of the valve of FIG. 1 in an intermediate position, in accordance with an embodiment of the present disclosure;

FIG. 3 is a cross-sectional side view of the valve of FIG. 1 in an open position, in accordance with an embodiment of the present disclosure;

FIG. 7 is a cross-sectional side view of a valve having a protrusion extending from a seat, in accordance with another embodiment of the present disclosure;

FIGS. 8-13 each illustrate a side view of a cage that may be used in the valve of FIG. 1, in accordance with various embodiments of the present disclosure;

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure relate to a valve configured to control a flow of fluid (e.g., gas and/or liquid) within a fluid-handling system. In particular, the valve disclosed herein may include certain features that enable control of an opening and/or closing rate (e.g., actuation rate) of the valve. Control of the opening and/or closing rate may in turn reduce water hammer (e.g., pressure spikes), thereby reducing wear on components of the valve and surrounding structures. In some cases, such features may advantageously reduce interflow (e.g., flow directly between an inlet and an outlet of the valve) during certain stages of an opening and/or closing stroke.

Figure 1:
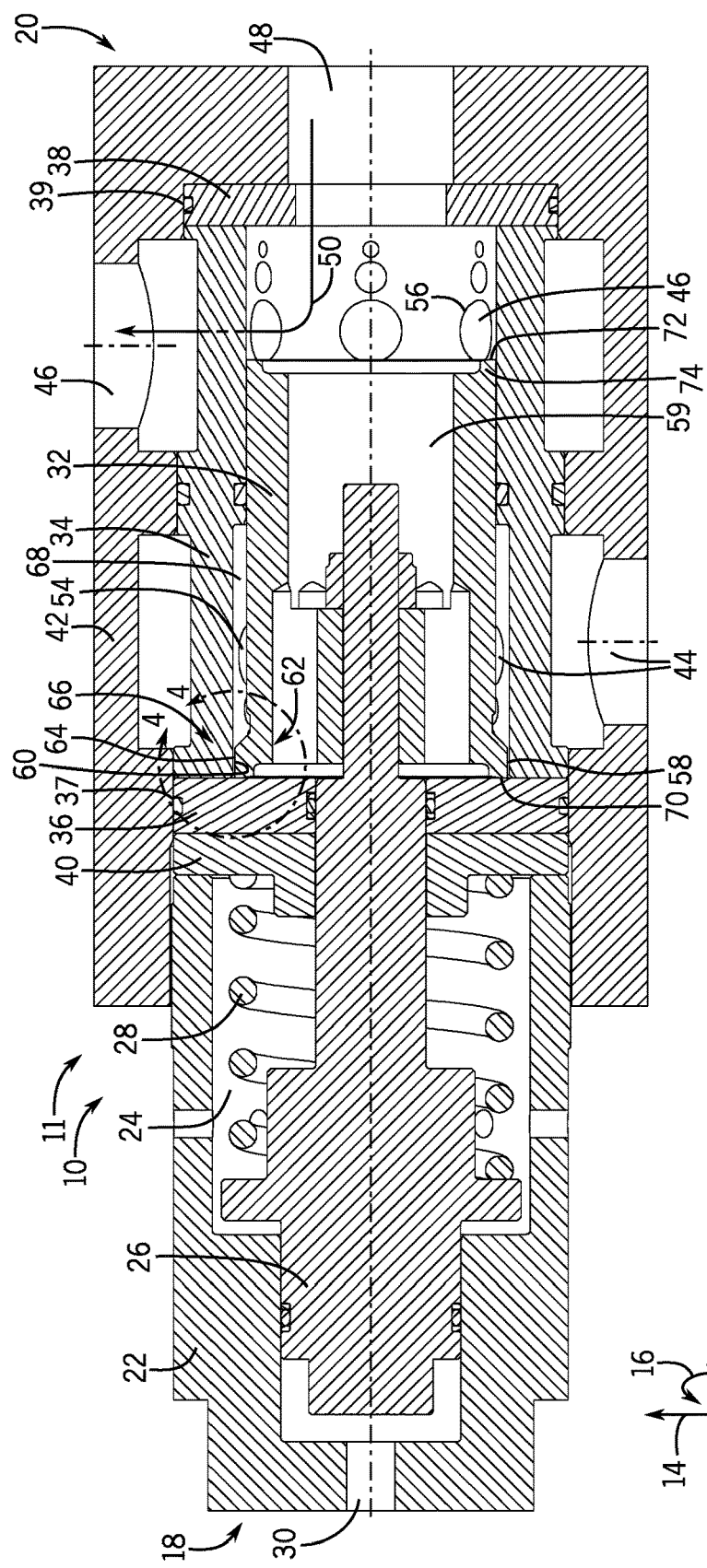
FIG. 1 is a cross-sectional side view of a valve in a closed position, in accordance with an embodiment of the present disclosure.

With the foregoing in mind, FIG. 1 is a cross-sectional side view of a valve 10 in a closed position 11, in accordance with an embodiment of the present disclosure. FIG. 2 is a cross-sectional side view of the valve 10 in an intermediate position 13, and FIG. 3 is a cross-sectional side view of the valve 10 in an open position 15. To facilitate discussion, the valve 10 may be described with reference to an axial axis or direction 12, a radial axis or direction 14, and/or a circumferential axis or direction 16. In certain embodiments, the valve 10 may be a sub-plate mounted (SPM) valve that is configured to be coupled to a blowout preventer stack and/or to control fluid flow to drive a ram or other movable component of the blowout preventer. To facilitate discussion, a normally closed, two position, three way valve is illustrated; however, it should be understood that the components and techniques disclosed herein may be adapted for use with other types of valves, such as normally open, bidirectional, and/or two position, two way valves.

As shown, the valve 10 extends between a first end 18 and a second end 20. In the illustrated embodiment, the valve 10 includes a piston housing 22 (e.g., annular housing) that defines a chamber 24 (e.g., a cavity). A pilot piston 26 is positioned within the chamber 24. As shown, a biasing member 28 (e.g., spring) configured to bias the pilot piston 26 toward the first end 18 of the valve 10 is also positioned within the chamber 24. A port 30 (e.g., pilot port) extends through the piston housing 22 to supply fluid to drive the pilot piston 26 relative to the piston housing 22 along the axial axis 12 toward the second end 20 of the valve 10.

As shown, a body 42 (e.g., annular body) is coupled (e.g., threadably coupled) to the piston housing 22, and a spool 32

(e.g., a closed annular wall or spool) is coupled (e.g., via a fastener) to the pilot piston 26. The spool 32 is configured to move axially within a cage 34 (e.g., a perforated annular cage). For example, when pilot pressure is applied to the pilot piston 26, the pilot piston 26 drives the spool 32 axially relative to the cage 34 from the closed position 11 to the open position 15. When pilot pressure is removed, the biasing member 28 urges the pilot piston 26 toward the first end 18 of the valve 10, thereby causing the spool 32 to return to the closed position 11. As shown, the cage 34 is positioned between a first seal plate 36 (e.g., annular plate supporting one or more annular sealing rings 37) and a second seal plate 38 (e.g., annular plate supporting one or more annular sealing rings 39). In some embodiments, one or more support plates 40 may be provided adjacent to the seal plates 36, 38 to support the seal plates 36, 38.

In the illustrated embodiment, a supply port 44 and a vent port 46 extend radially through the body 22 and the cage 34. As shown, the vent port 46 is positioned between the supply port 44 and the second end 20 along the axial axis 12, and an outlet 48 is positioned at the second end 20 of the valve 10. In operation, fluid may flow from the outlet 48 to the vent port 46 while the valve 10 is in the closed position 11, as shown by arrow 50, and fluid may flow from the supply port 44 to the outlet 48 while the valve 10 is in the intermediate position 13 and the open position 15, as shown by arrow 52. Additionally, while the valve 10 is in the closed position 11, the spool 32 may block fluid flow between the supply port 44 and the outlet 48, and while the valve 10 is in the open position 15, the spool 32 may block fluid flow between the vent port 46 and the outlet 48.

In certain embodiments, a radially-outer surface 60 (e.g., annular surface) at a first end 62 (e.g., proximal end) of the spool 32 may be positioned proximate to and/or may be configured to seal against a radially-inner surface 64 (e.g., annular surface) at a first end 66 (e.g., proximal end) of the cage 34, thereby reducing and/or blocking fluid flow from the supply port 44 toward the outlet 48 while the spool 32 is in the closed position 11 and/or during certain portions of the opening stroke. For example, a small radial clearance 58 (e.g., annular gap) between the radially-outer surface 60 and the radially-inner surface 64 may block fluid from a cavity 68 (e.g., annular cavity) defined between the spool 32 and the cage 34 from traveling about the first end 62 of the spool 32, into a passageway 59 of the spool 32, and toward the outlet 48 while the spool 32 is in the closed position 11 and/or during certain portions of the opening stroke, such as at the beginning of the opening stroke (e.g., after the first end 62 separates from the first seal plate 36, and before the first end 62 of the spool 32 passes the supply port 44 formed in the cage 34 as the spool 32 moves from the closed position 11 toward the open position 15). As shown, in the closed position 11, an axially-facing surface 70 (e.g., planar end surface) at the first end 62 of the spool 32 may contact and/or seal against the first seat plate 36. In the open position 15, an axially-facing surface 72 (e.g., planar end surface) at a second end 74 of the spool 32 may contact and/or seal against the second seat plate 38.

In certain embodiments, a flow area (e.g., cross-sectional area) of the supply port 44 increases from the first end 18 to the second end 20 of the valve 10 along the axial axis 12 and/or a flow area (e.g., cross-sectional area) of the vent port 46 decreases from the first end 18 to the second end 20 of the valve 10 along the axial axis 12. For example, as shown, the supply port 44 includes multiple discrete holes 54 (e.g., openings or channels) formed in the cage 34 and arranged in order of increasing flow area from the first end 18 to the second end 20 along the axial axis 12 and the vent port 46 includes multiple discrete holes 56 formed in the cage 34 and arranged in order of decreasing flow area from the first end 18 to the second end 20 along the axial axis 12. In some such embodiments, a flow area of a smallest discrete hole 54, 56 may be less than or approximately 10 to 80 percent of a flow area of a largest discrete hole 54, 56 formed in the cage 34. In some embodiments, the flow area between adjacent axially-spaced holes 54, 56 may vary by at least approximately 5 to 30 percent or more. Thus, as the spool 32 moves within the cage 34 from the closed position 11 toward the open position 15, a rate of fluid flow through the supply port 44 increases. Similarly, as the spool 32 moves within the cage 34 from the open position 15 toward the closed position 11, a rate of fluid flow through the vent port 46 increases. Accordingly, certain embodiments disclosed herein may advantageously throttle or control a rate of fluid flow through the valve 10, and thus, may control the opening and closing rate of the valve 10 and reduce water hammer. Furthermore, in certain embodiments, in the intermediate position 13, only portions (e.g., relatively smallest portions) of the supply port 44 and/or the vent port 46 are in fluid communication with one another, thereby reducing interflow (e.g., flow of fluid from the supply port 44 through the vent port 46 as the valve 10 transitions between the closed position 11 and the open position 15) within the valve 10. Various configurations of the supply port 44 and the vent port 46 of the cage 34 are illustrated and described in more detail below with respect to FIGS. 8 and 13.

Figure 4:
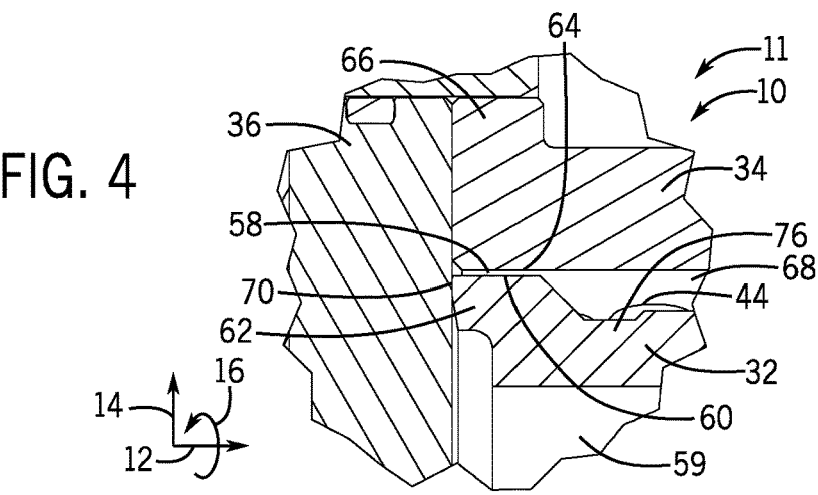
FIG. 4 is a cross-sectional side view of a portion of the valve of FIG. 1 taken within line 4-4, in accordance with an embodiment of the present disclosure.

FIG. 4 is a cross-sectional side view of a portion of the valve 10 taken within line 4-4 in FIG. 1, in accordance with an embodiment of the present disclosure. As shown, the radial clearance 58 between the radially-outer surface 60 at the first end 62 of the spool 32 and the radially-inner surface 64 at the first end 66 of the cage 34 may be dimensioned to reduce and/or block fluid flow from the supply port 44 into the passageway 59 of the spool 32 while the spool 32 is in the closed position 11 and/or during certain portions of the opening stroke. As shown, in the closed position 11, the axially-facing surface 70 at the first end 62 of the spool 32 may contact and/or seal against the first seat 36. In certain embodiments, the radial clearance 58 may be less than or equal to approximately 0.25 to 15 millimeters (mm). In certain embodiments, the radial clearance 58 may be between 0.25 to 10, 0.5 to 5, or 1 to 2 mm. In certain embodiments, the radial clearance 58 may be less than or equal to approximately 0.5 to 10 percent of a diameter across the first end 62 the spool 32 (e.g., between diametrically opposed portions of the radially-outer surface 60 at the first end 62 of the spool 32). In certain embodiments, the radial clearance 58 may be between approximately 0.5 to 10, 1 to 5, or 2 to 3 percent of the diameter across the first end 62 of the spool 32. As shown, the spool 32 may include a distal portion 76 having a relatively smaller diameter (e.g., smaller than the diameter at the first end 62 of the spool 32) to define the cavity 68 between the spool 32 and the cage 34.

Figure 5:
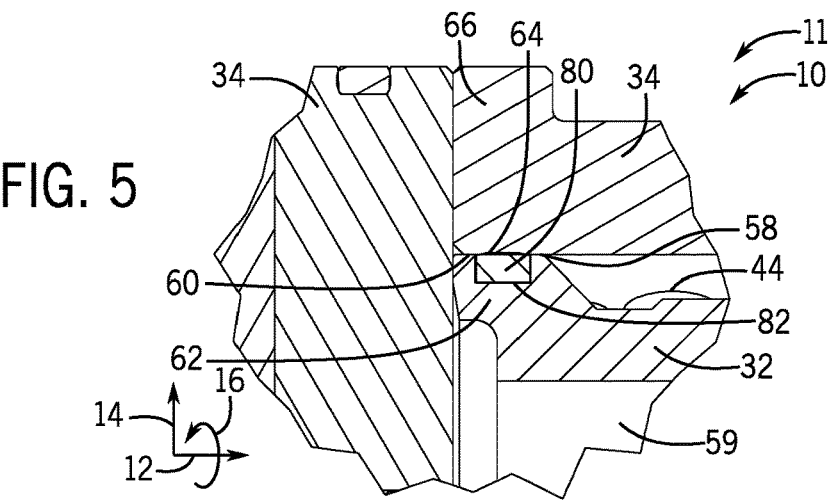
FIG. 5 is a cross-sectional side view of the portion of the valve of FIG. 4 having an annular seal, in accordance with an another embodiment of the present disclosure.

FIG. 5 is a cross-sectional side view of the portion of the valve 10, in accordance with another embodiment of the present disclosure. As shown, a seal 80 (e.g., annular seal or sealing ring) extends radially across the radial clearance 58 between the radially-outer surface 60 at the first end 62 of the spool 32 and the radially-inner surface 64 at the first end 66 of the cage 34 to block fluid flow from the supply port 44 into the passageway 59 of the spool 32 while the spool 32 is in the closed position 11 and/or during certain portions of the opening stroke. In the illustrated embodiment, the seal 80 is positioned within a seal groove 82 (e.g., annular seal groove) formed in the radially-outer surface 60 of the spool 32. However, in some embodiments, the seal 80 may be positioned within a seal groove formed in the radially-inner surface 64 of the cage 34. In certain embodiments, the radial clearance 58 may include the dimensions disclosed above with respect to FIG. 4. Additionally, although one seal 80 is illustrated in FIG. 5, multiple seals 80 may be positioned at discrete locations along the axial axis 12 of the valve 10. The seal 80 may be formed from any suitable material, such as a metal, metal alloy, elastomer, or a combination thereof.

Figure 6:
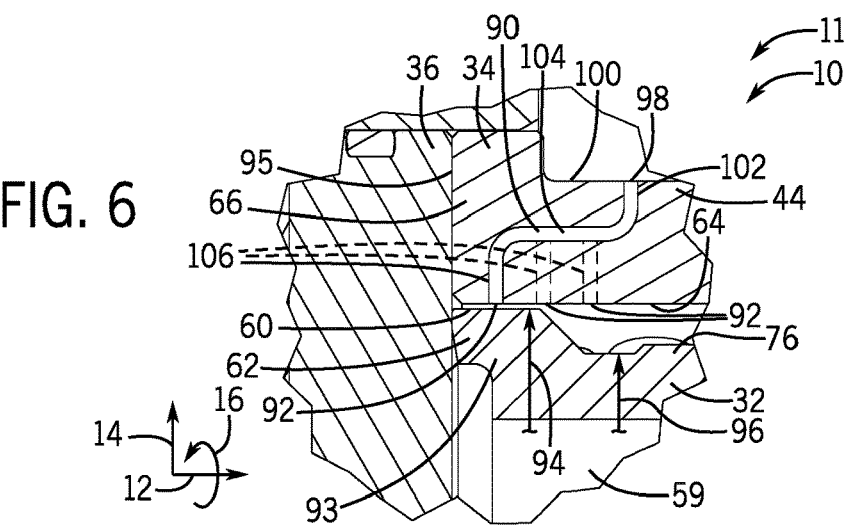
FIG. 6 is a cross-sectional side view of a portion of a valve having an axially-extending channel formed within a cage, in accordance with another embodiment of the present disclosure.

FIG. 6 is a cross-sectional side view of the portion of the valve 10 having a channel 90 (e.g., axially-extending channel or passageway) formed within the cage 34, in accordance with another embodiment of the present disclosure. The channel 90 may have a geometry and/or dimensions that control a rate of fluid flow from the supply port 44 into the passageway 59 of the spool 32 as the spool 32 moves from the closed position 11 toward the open position 15. In some embodiments, the channel 90 may include one or more openings 92 in the radially-inner surface 64 of the cage 34, and at least some of the one or more openings 92 may be axially aligned with the radial clearance 58 (e.g., axially aligned with a proximal portion 93 of the spool 32 having a larger diameter 94 as compared to the distal portion 76 with a smaller diameter 96) and/or may be within approximately 0.5 to 20 mm of an axially-facing surface 95 at the first end 66 of the cage 34. As the spool 32 moves from the closed position 11 toward the open position 15, the one or more openings 92 may be exposed to enable fluid flow into the passageway 59.

As shown, the channel 90 extends between an opening 98 formed in a radially-outer surface 100 of the cage 34 and one opening 92 formed in the radially-inner surface 64 of the cage 34. A component of the channel 90 may extend along the axial axis 12. For example, the illustrated channel 90 includes the opening 98 formed in the radially-outer surface 100 of the cage 34, a first radially-extending portion 102, an axially-extending portion 104, a second radially-extending portion 106, and the opening 92 formed in the radially-inner surface 64. As shown, the opening 92 is positioned between the first end 66 of the cage 34 and the opening 98 along the axial axis 12.

Although the illustrated channel 90 fluidly couples one opening 98 to one opening 92, it should be understood that the valve 10 may include multiple channels 90, and each channel 90 may fluidly couple any suitable number of openings 98 to any suitable number of openings 92. For example, multiple radially extending portions 106 may extend radially from the axially-extending portion 104 of the channel 90 to respective openings 92 in the radially-inner surface 64 of the cage 34, as shown in dotted lines. Thus, the channel 90 may be a branched passageway having multiple openings 92 distributed circumferentially about the cage 34 and/or axially along the cage 34. In some embodiments, the multiple openings 92 may have different flow areas (e.g., progressively increasing flow areas between the first end 18 and the second end 20 of the valve 10). In some embodiments, a flow area of the openings 92 may increase from the first end 18 to the second end 20 of the valve 10 along the axial axis 12. Furthermore, the channel 90 may have any suitable form for connecting respective openings 92, 98, such as a straight path extending between the openings 98, 92 and positioned at an angle with respect to the axial axis 12, for example.

FIG. 7 is a cross-sectional side view of the valve 10 having at least one protrusion 110 (e.g., axially-extending structure) extending from the first seat 36, in accordance with another embodiment of the present disclosure. The at least one protrusion 110 may be an annular structure, or multiple protrusions 110 may extend from the first seat 36 at discrete locations spaced about the circumference of the first seat 36 (e.g., to fit within corresponding sections or openings that form the passageway 59 through the spool 32). In some embodiments, a length 111 of the at least one protrusion 110 may be equal to or greater than approximately 5 to 25 percent of a length 113 of the spool 32. In some embodiments, the length 111 may be between approximately 5 to 30, 10 to 25, or 15 to 20 percent of the length 113. The at least one protrusion 110 may extend into the passageway 59 of the spool 32 at least while the spool 32 is in the closed position 11 and over a portion of the opening stroke. Thus, as the spool 32 moves from the closed position 11 toward the open position 15, the rate of fluid flow may be affected by the presence of the at least one protrusion 110 within the passageway 59.

In some embodiments, a cross-sectional area of the at least one protrusion 110 may vary along the axial axis 12. For example, a cross-sectional area (e.g., taken within a plane perpendicular to the axial axis 12) at a first axial location 112 of the at least one protrusion 110 may be greater than a cross-sectional area at a second axial location 114 of the at least one protrusion 110. In some embodiments, the cross-sectional area may vary along the length of the at least one protrusion by at least or approximately 10 to 70 percent. In some embodiments, a radially-outer surface 116 of the at least one protrusion 110 may be tapered or stepped along the axial axis 12, such that a radial clearance 118 between the radially-outer surface 116 of the at least one protrusion 110 and a radially-inner wall 120 of the spool 32 increases from the first axial location 112 to the second axial location 114 of the at least one protrusion 110 while the valve 10 is in the closed position 11. Thus, as the spool 32 moves from the closed position 11 toward the open position 15, a flow area within the passageway 59 may gradually increase, thereby controlling the rate of fluid flow between the supply port 44 and the outlet 48, for example.

FIGS. 8-13 illustrate respective side views of various embodiments of the cage 34 that may be used with the valve 10. In particular, FIG. 8 illustrates a side view of the cage 34 that is illustrated in FIGS. 1-3. As shown, the supply port 44 includes multiple discrete holes 54 (e.g., openings or channels) arranged in order of increasing flow area from the first end 66 to a second end 130 of the cage 34 along the axial axis 12 and the vent port 46 includes multiple discrete holes 56 arranged in order of decreasing flow area from the first end 66 to the second end 130 along the axial axis 12. As noted above, in some such embodiments, a flow area of a smallest discrete hole 54, 56 may be less than or approximately 10 to 80 percent of a flow area of a largest discrete hole 54, 56 formed in the cage 34. As shown, multiple sets 128 each including multiple discrete holes 54, 56 arranged in order of increasing or decreasing flow area may be positioned circumferentially about the cage 34. In the illustrated embodiment, each set 128 includes three discrete holes 54, 56; however, it should be understood that each set 128 may include any suitable number of holes 54, 56. For example, FIGS. 9 and 10 illustrate embodiments in which the cage 34 includes sets 128 having two holes 54, 56 of varying flow area. Furthermore, as shown in FIG. 10, the one or more holes 54, 56 may have different cross-sectional shapes. For example, in FIG. 9, the holes 54, 56 have generally circular cross-sectional shapes; however, in FIG. 10, one hole 131 includes a circular shape and another hole 132 includes a substantially oval shape having a width 134 extending along the circumferential axis 16 and a length 136 extending along the axial axis 12. In the illustrated embodiment, the length 136 is less than the width 134. In some embodiments, the length 136 may be less than or approximately 5 to 80 percent of the width 134. In other embodiments, the width 134 may be less than the length 136, such as less than or approximately 5 to 80 percent of the length 136.

FIG. 11 illustrates another embodiment of the cage 34 having axially-extending holes 54, 56 in which the width 134 is less than the length 136. In certain embodiments, the width 134 may be less than or approximately 5 to 80 percent of the length 136. As shown, the axially-extending holes 54, 56 are positioned at discrete locations about the circumference of the cage 34. The width 134 of the holes 54, 56 may be generally constant along the length 136, or the width 134 may vary along the length 136, as shown in FIG. 12. In FIG. 12, the flow area of the each hole 54 increases from the first end 66 to the second end 130 of the cage 34 along the axial axis 12 and the flow area of each hole 56 decreases from the first end 66 to the second end 130 along the axial axis 12.

Furthermore, rather than continuous holes 54, 56 extending along the axial axis 12, multiple sets 128 each including a series of discrete holes 54, 56 of substantially similar flow area may be provided, as shown in FIG. 13. Such a configuration may provide incremental increases in fluid flow through the holes 54, 56 during the opening and closing strokes. While each of the discrete holes 54, 56 shown in FIG. 13 generally have a circular cross-sectional shape, it should be understood that the holes 54, 56 may have other cross-sectional shapes, such as generally oval or rectangular cross-sectional shapes. It should be understood that the various features illustrated in FIGS. 8-13 are provided merely as examples and the features of each illustrated embodiment may be combined in any suitable manner. For example, each row of holes 54, 56 (e.g., each row extending circumferentially about the cage 34) may include a different number of holes 54, 56, such that a first row includes a first number of holes, and a second row that is axially spaced apart from the first row includes a second number of holes 54, 56. With reference to FIGS. 8-9 and 13, for example, a row of holes 54 proximate to the first end 66 of the cage 34 may include fewer holes 54 than a row of holes 54 positioned closer to the second end 130 of the cage 34.

Figure 14:
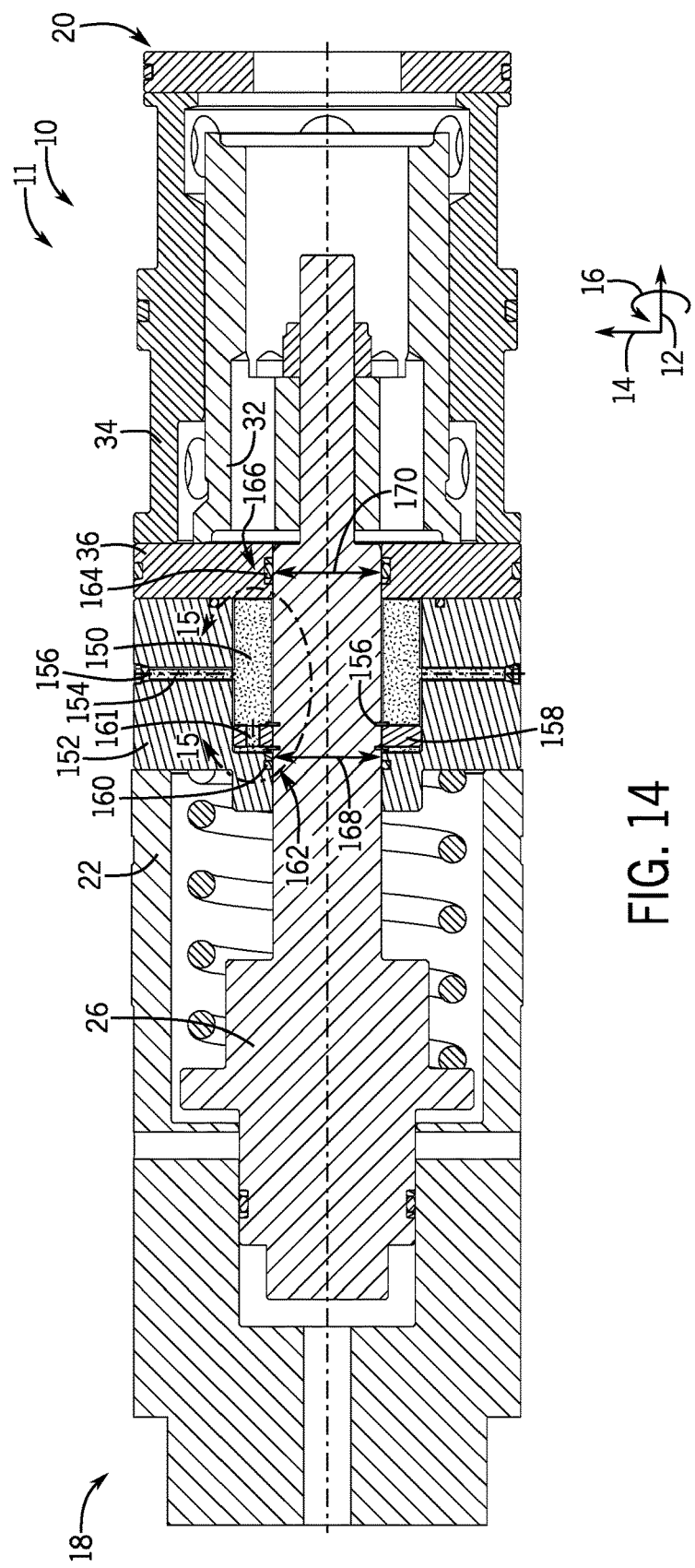
FIG. 14 is a cross-sectional side view of a valve having a damping chamber, in accordance with an embodiment of the present disclosure.
Figure 15:
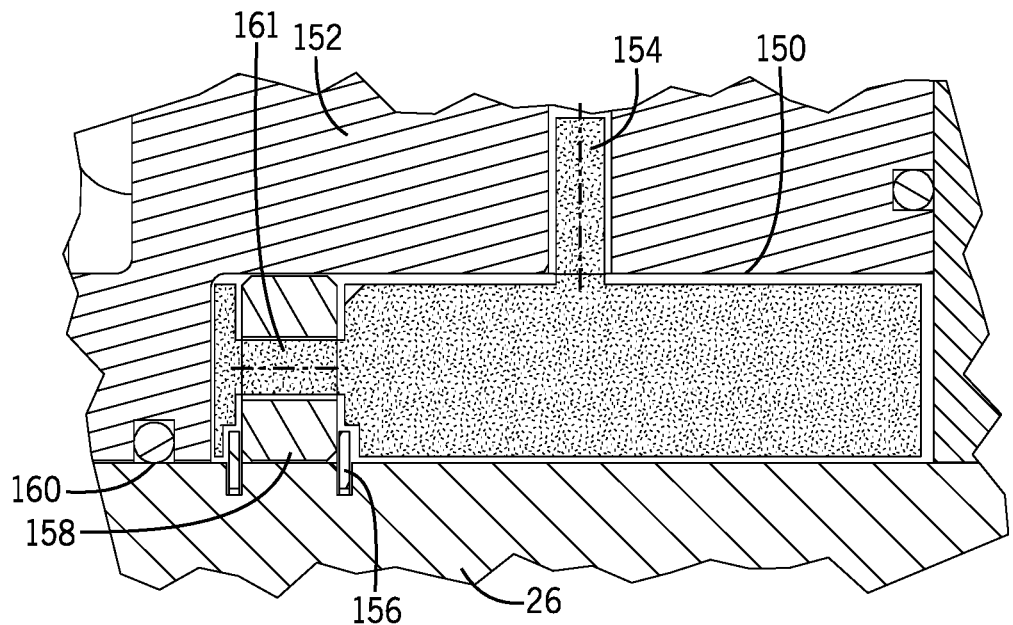
FIG. 15 is a cross-sectional side view of a portion of the valve of FIG. 14 taken within line 15-15, in accordance with an embodiment of the present disclosure.

FIG. 14 is a cross-sectional side view of the valve 10 having a damping chamber 150, in accordance with another embodiment of the present disclosure. FIG. 15 is a cross-sectional side view of a portion of the valve 10 of FIG. 14 taken within line 15-15. The damping chamber 150 may be an annular chamber extending circumferentially about the pilot piston 26, or the damping chamber 150 may extend about one or more portions of a circumference of the pilot piston 26.

In the illustrated embodiment, a support plate 152 (e.g., annular plate) is positioned between the piston housing 22 and the first seat 36. As shown, an annular damping chamber 150 is formed in the support plate 152 and circumferentially surrounds the pilot piston 26. One or more channels 154 may extend radially to the damping chamber 150 to supply fluid (e.g., damping fluid) to the damping chamber 150 (e.g., prior to operation or deployment of the valve 10), and a plug 156 (e.g., cap) may be provided to seal the fluid within the damping chamber 150. Thus, the fluid is provided to the damping chamber 150 prior to operation of the valve 10, the fluid is wholly contained or sealed within the damping chamber 150 during operation of the valve 10, and/or the damping chamber 150 does not rely on or utilize an external fluid source (e.g., transferred from a location outside of the piston housing 22, the body 42, and/or the support plate 152) during operation of the valve 10. Because the damping chamber 150 is a closed chamber and/or does not receive fluid during operation of the valve 10, the damping chamber 150 may not be clogged or damaged by external debris or the like during operation of the valve 10. In certain embodiments, the fluid utilized within the damping chamber 150 may be a viscous fluid, such as a dielectric fluid, silicone, oil, or the like. In some embodiments, the viscous fluid may have a viscosity between approximately 50 to 10000 centipoise (cps) at room temperature.

As shown, a plate 158 (e.g., annular plate) extends radially outward from the pilot piston 26 into the damping chamber 150. In the illustrated embodiment, the plate 158 is coupled (e.g., fixed or attached) to the pilot piston 26 via axially-spaced annular discs 156, although the plate 158 may be coupled to the pilot piston 26 via any suitable fasteners (e.g., threaded fasteners) or the plate 158 may be integrally formed with the pilot piston 26 (e.g., be a one-piece structure). The plate 158 may include one or more axially-extending openings 161 (e.g. orifices) configured to enable fluid flow across the plate 158. For example, in some embodiments, multiple axially-extending openings 161 (e.g., 2, 3, 4, 5, or more) may be positioned at discrete locations about the circumference of the plate 158. Thus, the rate of movement of the pilot piston 26 along the axial axis 12 during the opening and closing strokes is affected (e.g., damped, limited, controlled, etc.) by the rate of fluid flow through the one or more openings 161 across the plate 158 within the damping chamber 150. Such configurations may advantageously control the opening and closing rate of the valve 10, thereby reducing water hammer.

As shown, a first seal 160 (e.g., annular seal) is provided proximate to a first end 162 of the damping chamber 150 and a second seal 164 (e.g., annular seal) is provided proximate to a second end 166 of the damping chamber 150. The first and second seal 164 may be formed from any suitable material, such as a metal, metal alloy, elastomer, or any combination thereof. In the illustrated embodiments, the seals 160, 164 are positioned to extend radially between the support plate 152 and the pilot piston 26. Each seal 160, 164 is configured to seal against the pilot piston 26, and as shown, the first seal 160 seals about a first diameter 168 and the second seal 164 seals about a second diameter 170 that is substantially equivalent to the first diameter 168 (e.g., within 0.25 to 7 percent, and/or varying due to manufacturing tolerances). Such a configuration may cause the damping chamber 150 to be balanced and may block fluid trapped in the damping chamber 150 from piloting the valve 10. While the damping chamber 150 is shown within the support plate 152, it should be understood that the damping chamber 150 may be positioned at any suitable axial location along the pilot piston 26. For example, the damping chamber 150 may be positioned within the piston housing 22, such as proximate to the first end 18 of the valve 18. In some embodiments, the damping chamber 150 may be adapted for placement along the spool 32 (e.g., within the cage 34). In some embodiments, multiple damping chambers 150 may be provided at discrete circumferential and/or axial locations along the pilot piston 26 and/or the spool 32.

Figure 16:
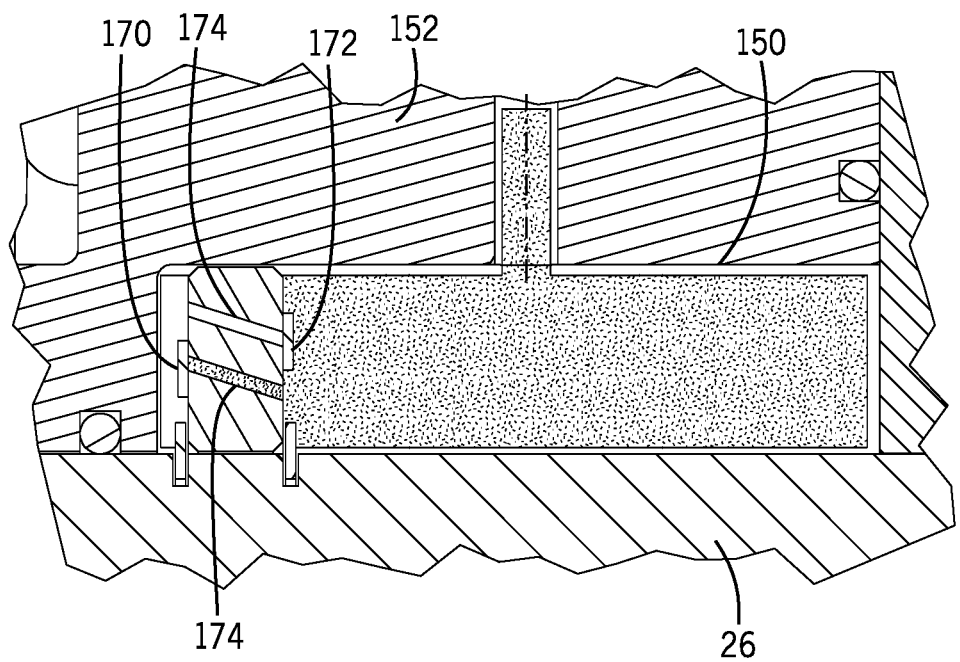
FIG. 16 is a cross-sectional side view of a portion of a damping chamber having plates, in accordance with an embodiment of the present disclosure.

Any of a variety of damping structures may be utilized in combination with the damping chamber 150. For example, FIG. 16 is a cross-sectional side view of a portion of the valve 10 having the damping chamber 150 surrounding the pilot piston 26. The plate 158 extends radially outward from the pilot piston 26 into the damping chamber 150. In the illustrated embodiment, a first plate 170 and a second plate 172 are positioned on respective axially-facing surfaces of the plate 158, and axially-extending openings 174 extend between the respective axially-facing surfaces of the plate 158. In operation, axial movement of the pilot piston 26 during the opening stroke is damped as fluid flows through the axially-extending openings 174 and contacts the first plate 170, and axial movement of the pilot piston 26 during the closing stroke is damped as fluid flows through the axially-extending openings 174 and contacts the second plate 172. In some embodiments, the valve 10 may be configured to open at a first rate and to close at a second rate. For example, only one of the first plate 170 or the second plate 172 may be provided, the first plate 170 and the second plate 172 may have different weights, one of the first plate 170 or the second plate 172 may have a larger diameter than the other and may intersect a greater number of axially-extending openings 174, or the like.

Figure 17:
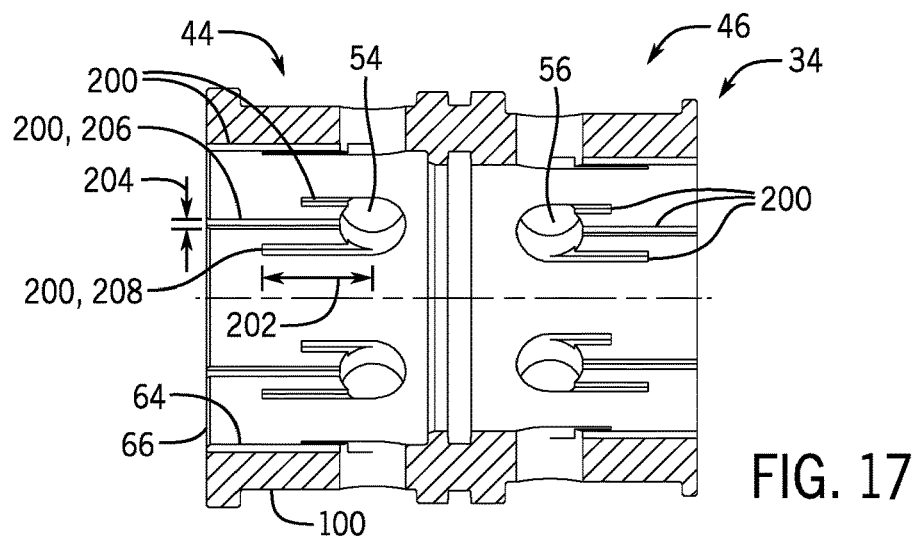
FIGS. 17-22 each illustrate a cross-sectional side view of a cage that may be used in the valve of FIG. 1, in accordance with various embodiments of the present disclosure.

FIGS. 17-22 illustrate respective cross-sectional side views of various embodiments of the cage 34 that may be used with the valve 10. In particular, FIG. 17 illustrates a cross-sectional side view of the cage 34 having one or more extensions 200 (e.g., grooves or shallow slots). As shown, the supply port 44 includes multiple discrete holes 54 (e.g., openings or channels) positioned circumferentially about the cage 34. At least one of the multiple discrete holes 54 may include one or more extensions 200 extending in the axial direction 12 and fluidly coupled to the respective discrete hole 54. As shown, the vent port 46 includes multiple discrete holes 56 positioned circumferentially about the cage 34. At least one of the multiple discrete holes 56 may include one or more extensions 200 extending in the axial direction 12 and fluidly coupled the respective discrete hole 56. In the illustrated embodiment, each discrete hole 54, 56 includes three extensions 200; however, it should be understood that discrete hole 54, 56 may include any suitable number of extensions 200. The extensions 200 may have any suitable dimensions, and in some embodiments, the extensions 200 may have different lengths 202 and/or widths 204 from one another. For example, as shown, one extension 200, 206 extends axially from the discrete hole 54 to the first end 66 of the cage 34, while another extension 200, 208 does not extend to the first end 66 of the cage 34. As shown, the discrete holes 54, 56 extend radially through the cage 34 (e.g., entirely through the cage 34 and are open to both the radially-inner surface 64 and the radially-outer surface 100 of the cage 34 to enable fluid flow radially across the wall of the cage 34). In some embodiments, at least one of the extensions 200 does not extend through the cage 34 (e.g., does not extend entirely through the wall of the cage 34, does not extend to and/or is not open to the radially-outer surface 100), but rather at least one of the extensions 200 is a groove formed in and open to the radially-inner surface 64 of the cage 34.

Figure 18:
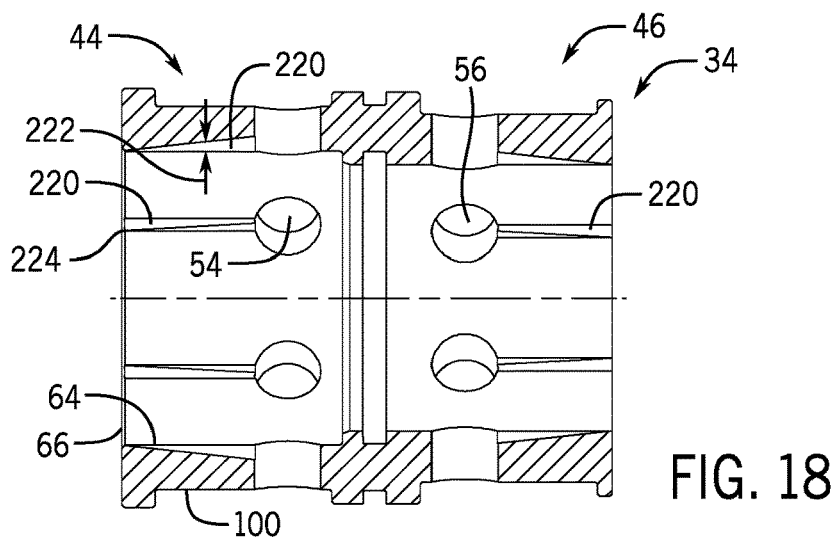

FIG. 18 illustrates an embodiment in which the cage 34 includes one or more angled extensions 220. As shown, the supply port 44 includes multiple discrete holes 54 and the vent port 46 includes multiple discrete holes 56 positioned circumferentially about the cage 34. In the illustrated embodiment, one angled extension 220 extends axially from each respective hole 54, 56, although any suitable number of angled extensions 220 may extend from each hole 54, 56. In the illustrated embodiment, the angled extension 220 is a groove formed in and open to the radially-inner surface 64 of the cage 34, and a depth 222 (e.g., in the radial direction 14) of the angled extension 220 may decrease from the hole 54 toward the first end 66 of the cage 34 (e.g., a first depth proximate the hole 54 is greater than a second depth proximate the first end 66 of the cage 34). While an end 224 of the angled extension 220 is located at the first end 66 of the cage 34, it should be understood that the angled extension 220 may extend only partially between the hole 54 and the first end 66 of the cage 34. Any other angled extensions 220 positioned about the cage 34 may have the same or different configurations.

Figure 19:
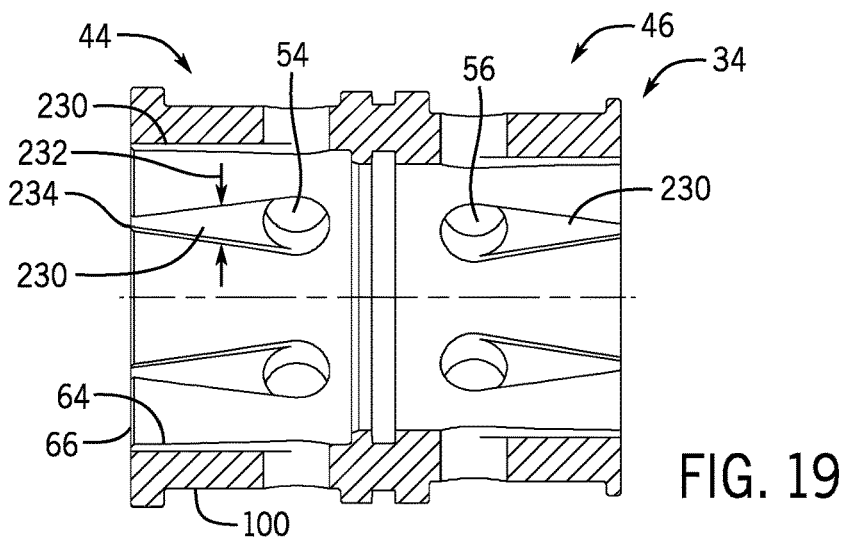

FIG. 19 illustrates an embodiment in which the cage 34 includes one or more tapered extensions 230. As shown, the supply port 44 includes multiple discrete holes 54 and the vent port 46 includes multiple discrete holes 56 positioned circumferentially about the cage 34. In the illustrated embodiment, one tapered extension 230 extends axially from each respective hole 54, 56, although any suitable number of tapered extensions 230 may extend from each hole 54, 56. In the illustrated embodiment, the tapered extension 220 is a groove formed in and open to the radially-inner surface 64 of the cage 34, and a width 232 (e.g., in the circumferential direction 16) of the tapered extension 230 may decrease from the hole 54 toward the first end 66 of the cage 34 (e.g., a first width proximate the hole 54 is greater than a second width proximate the first end 66 of the cage 34). While an end 234 of the tapered extension 230 is located at the first end 66 of the cage 34, it should be understood that the tapered extension 230 may extend only partially between the hole 54 and the first end 66 of the cage 34. Any other tapered extensions 230 positioned about the cage 34 may have the same or different configurations.

Figure 20:
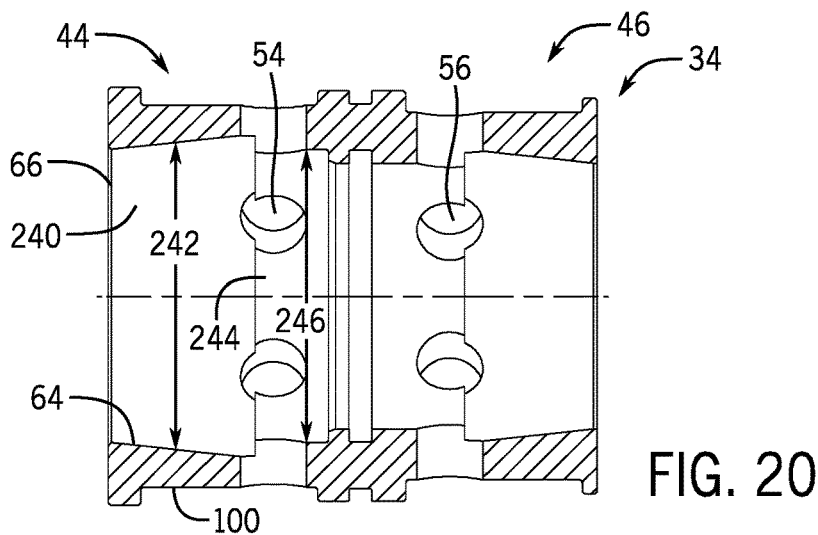

FIG. 20 illustrates an embodiment in which the cage 34 includes a stepped or varied inner diameter. In particular, the cage 34 a first portion 240 having a first inner diameter 242 and a second portion 244 having a second inner diameter 246 different than the first inner diameter 232. As shown, the supply port 44 includes multiple discrete holes 54 and the vent port 46 includes multiple discrete holes 56 positioned circumferentially about the cage 34. In the illustrated embodiment, the first portion 240 extends axially from each respective hole 54, 56 to the first end 66 of the cage 34. In the illustrated embodiment, the inner diameter of the first portion 240 gradually decreases from the hole 54 toward the first end 66 of the cage 34 (e.g., a first inner diameter of the first portion 240 proximate the hole 54 is greater than a second inner diameter of the first portion 240 proximate the first end 66 of the cage 34), and the first portion 240 is generally a circumferentially-extending groove formed in and open to the radially-inner wall 64 of the cage 34. While an end 248 of the first portion 240 coincides with the first end 66 of the cage 34, it should be understood that the first portion 240 may be located at any position along the axial axis 12 between the hole 54 and the first end 66 of the cage 34. In some embodiments, the vent port 46 may include a similar configuration, as shown.

Figure 21:
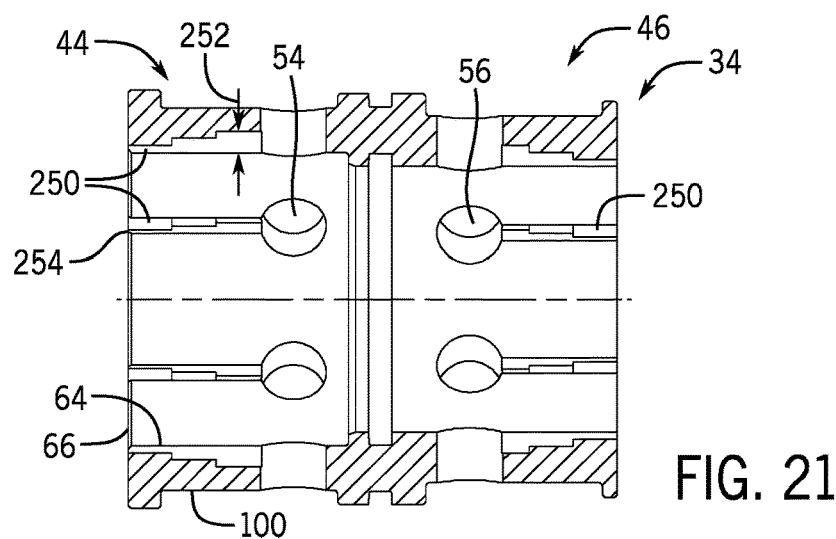

FIG. 21 illustrates an embodiment in which the cage 34 includes one or more stepped extensions 250. As shown, the supply port 44 includes multiple discrete holes 54 and the vent port 46 includes multiple discrete holes 56 positioned circumferentially about the cage 34. In the illustrated embodiment, one stepped extension 250 extends axially from each respective hole 54, 56, although any suitable number of stepped extensions 250 may extend from each hole 54, 56. In the illustrated embodiment, the stepped extension 250 is a groove formed in and open to the radially-inner surface 64 of the cage 34, and a depth 252 (e.g., in the radial direction 14) of the stepped extension 252 may decrease from the hole 54 toward the first end 66 of the cage 34 (e.g., a first depth proximate the hole 54 is greater than a second depth proximate the first end 66 of the cage 34). In particular, the depth 252 may increase incrementally or in a stepped manner (e.g., not gradually or via a linearly angled or tapered surface within the groove). In the illustrated embodiment, the stepped extension 250 includes three steps (e.g., defining three different depths 252), although any suitable number of steps may be provided within the stepped extension 250. While an end 254 of the stepped extension 250 is located at the first end 66 of the cage 34, it should be understood that the stepped extension 250 may extend only partially between the hole 54 and the first end 66 of the cage 34. Any other stepped extension 250 positioned about the cage 34 may have the same or different configurations.

Figure 22:
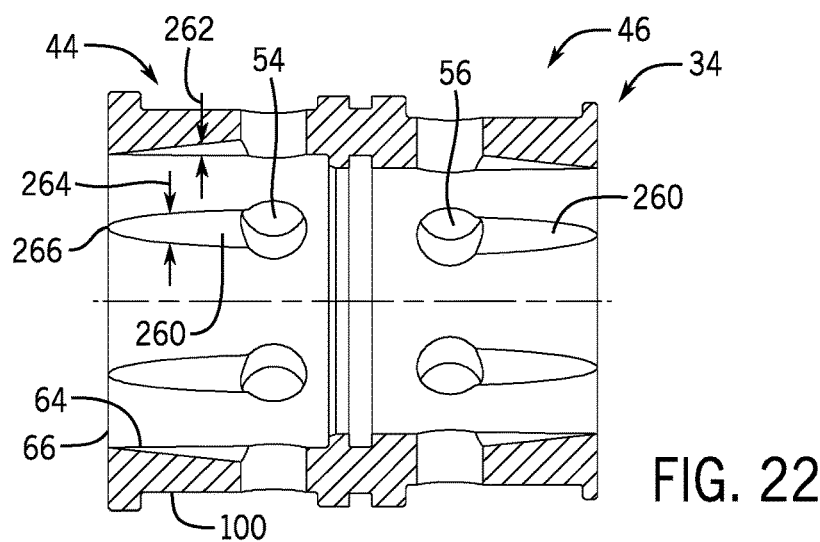

FIG. 22 illustrates an embodiment in which the cage 34 includes one or more angled extensions 260 having a varying depth 262 (e.g., in the radial direction 14) and a varying width 264 (e.g., in the circumferential direction). In particular, a first depth proximate the hole 54 is greater than a second depth proximate the first end 66 of the cage 34), and a first width proximate the hole 54 is greater than a second width proximate the first end 66 of the cage 34. As shown, the supply port 44 includes multiple discrete holes 54 and the vent port 46 includes multiple discrete holes 56 positioned circumferentially about the cage 34. In the illustrated embodiment, one angled extension 260 extends axially from each respective hole 54, 56, although any suitable number of angled extensions 260 may extend from each hole 54, 56. In the illustrated embodiment, the angled extension 260 is a groove formed in and open to the radially-inner surface 64 of the cage 34. While an end 266 of the angled extension 260 is located at the first end 66 of the cage 34, it should be understood that the angled extension 260 may extend only partially between the hole 54 and the first end 66 of the cage 34. Any other angled extensions 260 positioned about the cage 34 may have the same or different configurations.

The various extensions and grooves in FIGS. 17-22 that are part of the supply port 44 are in fluid communication with the holes 54 and may provide a leak path or a flow path, resulting in a flow area that increases between the first end 66 and the second end 130 of the cage 34 along the axial axis 12 of the valve 10. The various extensions and grooves in FIGS. 17-22 that are part of the vent port 46 are in fluid communication with the holes 56 and may provide a flow area that decreases between the first end 66 and the second end 130 the cage 34 along the axial axis 12 of the valve 10. Thus, the various extensions and grooves in FIGS. 17-22 may control a rate of fluid flow through the valve 10, control the opening and closing rate of the valve 10, and/or reduced water hammer, for example. It should be understood that the various features illustrated in FIGS. 17-22 are provided merely as examples and the features of any embodiment illustrated or described herein (e.g., with respect to FIGS. 1-22) may be combined in any suitable manner. For example, the cage 34 may include multiple angled extensions 230 having varying lengths, similar to the varying lengths 202 shown in FIG. 17. For example, the cage 34 may include various shaped holes 54, 56, as shown in FIGS. 8-13, in combination with various grooves formed in the radially-inner surface 64, as shown in FIGS. 17-22, as well as any of a variety of other combinations of features.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A valve, comprising:
a cage comprising at least one fluid inlet proximate a first end of the cage and a fluid outlet proximate a second end of the cage, wherein the first end of the cage is positioned closer to the at least one fluid inlet than to the fluid outlet and the fluid inlet comprises a channel having an axially-extending component and a radially-extending component;
a spool configured to move axially within the cage between an open position in which the spool enables fluid flow from the at least one fluid inlet to the fluid outlet and a closed position in which the spool blocks fluid flow from the at least one fluid inlet to the fluid outlet; and
an annular seal supported within an annular groove formed in one of the cage or the spool, wherein the annular seal is configured to seal a radial gap between the cage and the spool while the spool is in the closed position, and is positioned between the first end of the cage and the at least one fluid inlet along an axial axis of the valve to block fluid flow from the at least one fluid inlet to the fluid outlet while the spool is in the closed position.

2. The valve of claim 1, wherein the at least one fluid inlet comprises a flow area that increases between the first end and the second end of the cage along the axial axis of the valve.

3. The valve of claim 2, wherein the at least one fluid inlet comprises a plurality of fluid inlets, and the plurality of fluid inlets comprise discrete openings arranged in order of increasing flow area along the axial axis of the valve.

4. The valve of claim 1, wherein the at least one fluid inlet comprises an opening extending radially through the cage and a groove formed in a radially-inner surface of the cage that extends along the axial axis from the opening.

5. The valve of claim 1, comprising a vent port positioned between the fluid inlet and the fluid outlet along the axial axis of the valve, wherein the vent port comprises a flow area that decreases between the first end and the second end of the cage along the axial axis of the valve.

6. The valve of claim 1, comprising an annular seat positioned at the first end of the cage, wherein the annular seat comprises a protrusion that extends along the axial axis of the valve and into a passageway of the spool at least while the spool is in the closed position, and the protrusion is configured to throttle fluid flow from the fluid inlet toward the fluid outlet as the spool moves from the closed position toward the open position.

7. The valve of claim 1, comprising a piston housing and a piston supported within the piston housing, wherein application of a pilot pressure to the piston is configured to drive the spool within the cage, and the piston is positioned closer to the first end of the cage than to the second end of the cage.

8. The valve of claim 7, comprising a damping chamber configured to support a damping fluid, wherein a radially-extending plate coupled to the piston is disposed within the damping chamber such that a rate of movement of the piston along the axial axis is affected as the radially-extending plate moves within the damping chamber.

9. A valve, comprising:
a piston housing;
a piston supported within the piston housing;
a cage comprising at least one fluid inlet proximate a first end of the cage and a fluid outlet proximate a second end of the cage;
a spool configured to move in an axial direction within the cage between an open position in which the spool enables fluid flow from the at least one fluid inlet to the fluid outlet and closed position in which the spool blocks fluid flow from the at least one fluid inlet to the fluid outlet, wherein actuation of the piston is configured to drive the spool within the cage; and
a chamber positioned circumferentially about at least a portion of the piston, wherein the chamber is configured to support a damping fluid, and a plate extending radially from the piston extends into the chamber to adjust a rate of movement of the piston in the axial direction.

10. The valve of claim 9, wherein the damping fluid comprises oil.

11. The valve of claim 9, wherein the plate comprises an axially extending opening to enable the plate to pass through the damping fluid in the damping chamber.

12. The valve of claim 9, comprising a first annular seal and a second annular seal disposed on opposite ends of the damping chamber, wherein the first annular seal and the second annular seal against respective portions of the piston and the respective portions comprise substantially equivalent diameters.

13. The valve of claim 9, comprising an annular seal configured to seal a radial gap between the cage and the spool and to block fluid flow from the at least one fluid inlet to the fluid outlet while the spool is in the closed position.

14. The valve of claim 9, wherein the at least one fluid inlet comprises a flow area that increases between the first end and the second end of the cage along an axial axis of the valve.

15. A valve, comprising:
a cage comprising at least one fluid inlet proximate a first end of the cage and a fluid outlet proximate a second end of the cage;
a spool configured to move axially within the cage between an open position in which the spool enables fluid flow from the at least one fluid inlet to the fluid outlet and closed position in which the spool blocks fluid flow from the at least one fluid inlet to the fluid outlet; and
an annular seat positioned at the first end of the cage, wherein the annular seat comprises a protrusion that extends along an axial axis of the valve and into a passageway of the spool, wherein the protrusion is configured to throttle fluid flow from the fluid inlet toward the fluid outlet as the spool moves from the closed position toward the open position.

16. The valve of claim 15, comprising an annular seal configured to seal a radial gap between the cage and the spool and to block fluid flow from the at least one fluid inlet to the fluid outlet while the spool is in the closed position.

17. The valve of claim 15, wherein the fluid inlet comprises a channel having an axially-extending component and a radially-extending component.

18. The valve of claim 15, comprising a piston supported within a piston housing and coupled to the spool, wherein application of a pilot pressure to the piston is configured to drive the spool within the cage.

19. The valve of claim 18, comprising a damping chamber configured to support a damping fluid, wherein a radially-extending plate coupled to the piston is disposed within the damping chamber such that a rate of movement of the piston along the axial axis is affected as the radially-extending plate moves within the damping chamber.

\* \* \* \* \*